(12) United States Patent
Reter et al.

(10) Patent No.: US 9,460,422 B2
(45) Date of Patent: Oct. 4, 2016

(54) SYSTEMS AND METHODS FOR MANAGING TO-DO LIST TASK ITEMS TO AUTOMATICALLY SUGGEST AND ADD PURCHASING ITEMS VIA A COMPUTER NETWORK

(75) Inventors: Jude Reter, Chicago, IL (US); Kristen Miller, Chicago, IL (US); Patrick Richard, Chicago, IL (US); Jennifer Ready, Marietta, GA (US); Terri Durkin, Atlanta, GA (US); Amanda Fraser, Atlanta, GA (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 602 days.

(21) Appl. No.: 12/622,803

(22) Filed: Nov. 20, 2009

(65) Prior Publication Data

US 2011/0126123 A1   May 26, 2011

(51) Int. Cl.
*G06Q 10/10* (2012.01)
*G06F 15/02* (2006.01)
*G06Q 50/00* (2012.01)
*G06Q 10/06* (2012.01)
*G06Q 30/06* (2012.01)

(52) U.S. Cl.
CPC ......... *G06Q 10/109* (2013.01); *G06F 15/0266* (2013.01); *G06Q 10/06* (2013.01); *G06Q 30/0633* (2013.01); *G06Q 50/01* (2013.01)

(58) Field of Classification Search
CPC . G06Q 10/109; G06Q 10/06; G06Q 30/0633
USPC ................. 715/751; 705/14.61, 14.14, 14.67
See application file for complete search history.

(56) References Cited

U.S. PATENT DOCUMENTS

| 5,570,109 | A | | 10/1996 | Jenson | |
|---|---|---|---|---|---|
| 5,859,637 | A | * | 1/1999 | Tidwell, II | .................... 715/708 |
| 5,873,108 | A | * | 2/1999 | Goyal et al. | .................. 715/203 |
| 5,983,200 | A | * | 11/1999 | Slotznick | ................... 705/26.43 |
| 6,108,640 | A | * | 8/2000 | Slotznick | ................... 705/7.18 |
| 6,426,943 | B1 | * | 7/2002 | Spinney et al. | ............. 370/235 |
| 6,680,675 | B1 | | 1/2004 | Suzuki | |
| 6,748,582 | B1 | * | 6/2004 | Chiles et al. | ................. 717/111 |

(Continued)

OTHER PUBLICATIONS

Title: Microsoft Office Support—Create tasks and to-do items, Change a completed task to active, Change the appearance of tasks, Create a task, Share task folders with others (Outlook 2007, Outlook 2003) Date: 2007.*

(Continued)

*Primary Examiner* — Ajay Bhatia
*Assistant Examiner* — Phoebe Pan
(74) *Attorney, Agent, or Firm* — McAndrews, Held & Malloy, Ltd.

(57) ABSTRACT

A system and method for managing to-do list task items provides a user interface having user interface elements for allowing the user to add one or more task items to a to-do list, for allowing the user to edit one or more fields associated with a task item added to the to-do list, and for allowing the user to designate a task item within the to-do list as completed whereupon the designated task item is placed into a completed list and removed from the to-do list. Within the system, a task item is defined by at least a title, a description, a due date, and a tag. The tags provide a means for the task items to be organized within lists as well as within the system to, for example, allow task items to be shared, searched on, and the like.

23 Claims, 19 Drawing Sheets

(56) References Cited

U.S. PATENT DOCUMENTS

| | | | |
|---|---|---|---|
| 7,324,965 B2 | 1/2008 | Martineau et al. | |
| 7,356,490 B1 | 4/2008 | Jacobi et al. | |
| 7,418,482 B1* | 8/2008 | Lusher et al. | 709/219 |
| 7,801,774 B2* | 9/2010 | Karnalkar et al. | 705/26.1 |
| 7,975,239 B2* | 7/2011 | Bellotti et al. | 715/825 |
| 8,015,036 B1* | 9/2011 | Leisure | 705/4 |
| 8,055,712 B2* | 11/2011 | Kagawa et al. | 709/205 |
| 8,156,009 B2* | 4/2012 | Karnalkar et al. | 705/26.1 |
| 8,504,440 B1* | 8/2013 | Kolawa et al. | 705/26.7 |
| 2002/0023230 A1* | 2/2002 | Bolnick et al. | 713/202 |
| 2002/0055946 A1* | 5/2002 | Prager et al. | 707/500 |
| 2002/0078007 A1* | 6/2002 | Herrero | 707/1 |
| 2002/0143564 A1* | 10/2002 | Webb et al. | 705/1 |
| 2002/0161658 A1* | 10/2002 | Sussman | 705/26 |
| 2003/0004831 A1* | 1/2003 | Owens | 705/26 |
| 2003/0018543 A1* | 1/2003 | Alger et al. | 705/27 |
| 2004/0030992 A1* | 2/2004 | Moisa et al. | 715/513 |
| 2004/0230685 A1 | 11/2004 | Seligmann | |
| 2005/0026131 A1* | 2/2005 | Elzinga et al. | 434/365 |
| 2005/0097007 A1* | 5/2005 | Alger et al. | 705/26 |
| 2005/0138631 A1* | 6/2005 | Bellotti et al. | 719/310 |
| 2005/0177458 A1* | 8/2005 | Martineau et al. | 705/26 |
| 2006/0036503 A1* | 2/2006 | Schweier | G06Q 30/06 705/26.8 |
| 2006/0059049 A1* | 3/2006 | Morris et al. | 705/26 |
| 2006/0069604 A1* | 3/2006 | Leukart et al. | 705/9 |
| 2006/0168582 A1* | 7/2006 | Muller et al. | 718/100 |
| 2006/0288347 A1* | 12/2006 | Jemiolo et al. | 718/102 |
| 2007/0038495 A1* | 2/2007 | Miner | 705/8 |
| 2007/0050253 A1* | 3/2007 | Biggs et al. | 705/14 |
| 2007/0094661 A1* | 4/2007 | Baird et al. | 718/102 |
| 2007/0129888 A1* | 6/2007 | Rosenberg | 701/213 |
| 2007/0130186 A1* | 6/2007 | Ramsey et al. | 707/101 |
| 2007/0168885 A1* | 7/2007 | Muller et al. | 715/853 |
| 2007/0209010 A1* | 9/2007 | West | 715/762 |
| 2007/0250784 A1* | 10/2007 | Riley et al. | 715/764 |
| 2007/0255593 A1 | 11/2007 | Muehlmeier et al. | |
| 2008/0005055 A1* | 1/2008 | Horvitz | 706/62 |
| 2008/0040341 A1* | 2/2008 | York et al. | 707/5 |
| 2008/0065460 A1* | 3/2008 | Raynor | 705/9 |
| 2008/0119132 A1* | 5/2008 | Rao | 455/3.04 |
| 2008/0141144 A1* | 6/2008 | Muller et al. | 715/751 |
| 2008/0154632 A1 | 6/2008 | Jacobi et al. | |
| 2008/0155547 A1* | 6/2008 | Weber et al. | 718/102 |
| 2008/0177726 A1* | 7/2008 | Forbes et al. | 707/5 |
| 2008/0215366 A1* | 9/2008 | Robson et al. | 705/2 |
| 2008/0249865 A1* | 10/2008 | Angell et al. | 705/14 |
| 2008/0294988 A1* | 11/2008 | Nicholas et al. | 715/710 |
| 2009/0037362 A1* | 2/2009 | Fox | 707/1 |
| 2009/0055415 A1* | 2/2009 | Golds et al. | 707/100 |
| 2009/0094260 A1 | 4/2009 | Cheng et al. | |
| 2009/0094623 A1 | 4/2009 | Chakra et al. | |
| 2009/0100076 A1 | 4/2009 | Hamilton, II et al. | |
| 2009/0100367 A1* | 4/2009 | Dargahi et al. | 715/769 |
| 2009/0112729 A1 | 4/2009 | Shah | |
| 2009/0113428 A1 | 4/2009 | Huff et al. | |
| 2009/0152349 A1* | 6/2009 | Bonev et al. | 235/383 |
| 2009/0157459 A1* | 6/2009 | Nastacio | 705/8 |
| 2009/0157513 A1* | 6/2009 | Bonev et al. | 705/14 |
| 2009/0157658 A1* | 6/2009 | Bonev et al. | 707/5 |
| 2009/0158200 A1* | 6/2009 | Palahnuk et al. | 715/781 |
| 2009/0187453 A1* | 7/2009 | Dill et al. | 705/9 |
| 2009/0199113 A1* | 8/2009 | McWhinnie et al. | 715/762 |
| 2009/0222277 A1* | 9/2009 | Malek et al. | 705/1 |
| 2009/0281865 A1* | 11/2009 | Stoitsev | 705/9 |
| 2009/0287532 A1* | 11/2009 | Cohen et al. | 705/9 |
| 2009/0287731 A1* | 11/2009 | Motoyama et al. | 707/102 |
| 2010/0004921 A1* | 1/2010 | Hufnagel et al. | 704/9 |
| 2010/0030578 A1* | 2/2010 | Siddique et al. | 705/3 |
| 2010/0057757 A1* | 3/2010 | Blondi et al. | 707/100 |
| 2010/0269049 A1* | 10/2010 | Fearon | 715/744 |
| 2011/0106736 A1* | 5/2011 | Aharonson et al. | 706/12 |
| 2011/0126123 A1* | 5/2011 | Reter et al. | 715/751 |
| 2011/0209062 A1* | 8/2011 | Faenger et al. | 715/716 |
| 2012/0030210 A1* | 2/2012 | Sankhla et al. | 707/741 |
| 2012/0284174 A1* | 11/2012 | Bentley et al. | 705/39 |

OTHER PUBLICATIONS

Title: Organzing with Outlook Categories Date: Aug. 16, 2010.*
Title: The Tasks Module Author: Melissa Macbeth Date: Feb. 24, 2006.*
Title: Ta-da lists Date: Sep. 2005.*
Title: The Microsoft Office Specialist Study Guide Author: Joice Cox; Joan Preppemau Date: Apr. 15, 2008 Relavant pages: Chapter 5, pp. 1/23-4/23.*

\* cited by examiner

What do you need to do?

You add it here. We help you get it done.

[ 401 ] [ Add it ]

Sign in to save.
Log in or sign up now to save items to your list.
Not sure where to start?
Tell us a little about you and we can help you figure it out.

To-do (0)
To-buy (0)
Got it done (0)
My Quick lists ⓘ

[ Click here or drag over a list item to create a new Quick list ]

View all items (0)

Oh no! There's nothing on your list.
This isn't your average pen-and-paper list. It's a new system for staying on top of details, a smarter way to get things done. We've set-up a to-do list and to-buy list for you. Quick lists allow you to organize how you want. The best part - you're never alone as you work towards completing each of your items.

Get started here. Tell us a few things about your home - let us get you the information you need.

× [ 402 ]

Question 1 of 3
What best describes your home type?   22% of lister's reponded the same way!

Condo space
Single family
Multi family
Ranch
Split level

[ Next ]

Need more ideas?

| Recently Added | Random Selection | Editor's Top Lists | Looking for something specific? |
|---|---|---|---|
| Task name \| add (Task author, # mins ago) | Task name \| add (Task author, # mins ago) | List name | Green (100) |
| Task name \| add (Task author, # mins ago) | Task name \| add (Task author, # mins ago) | List name | Healthy home (100) |
| Task name \| add (Task author, # mins ago) | Task name \| add (Task author, # mins ago) | List name | Lifestyle (100) |
| Task name \| add (Task author, # mins ago) | Task name \| add (Task author, # mins ago) | List name | Seasonal (100) |
| Task name \| add (Task author, # mins ago) | Task name \| add (Task author, # mins ago) | List name | Electrical systems (100) |
| Task name \| add (Task author, # mins ago) | Task name \| add (Task author, # mins ago) | List name | Moving (100) |
| | | | Organization (100) |
| Refresh | Refresh | More | More |

*FIG. 4A*

What do you need to do?

You add it here. We help you get it done. [          ] (Add it)

— 401

Sign in to save.
Log in or sign up now to save items to your list.
Not sure where to start?
Tell us a little about you and we can help you figure it out.

☐ ▫
To-do (3)
To-buy (0)
Got it done (0)
My Quick lists ⊕

Click here or drag over a list item to create a new Quick list.

View all items (3)

We've added the items you selected while browsing the site to your list below.  ✕

This isn't your average pen-and-paper list. It's a new system for staying on top of details, a smarter way to get things done. We've set-up a to-do list and to-buy list for you. Quick lists allow you to organize how you want. The best part - you're never alone as you work towards completing each of your items.

Get recommendations here. Tell us a few things about your home - let us get you the information you need.

┌─── 402
Question 1 of 3
What are you interested in?
Green living  Green living
Cost saving  Cost saving
Safety & security  Safety & security
Healthy home  Healthy home
Renovations  Renovations
(Previous)  (Next)

Print | Send | Share on: [▼ manage 🏠 home] (Go)

To-do
Got it done ⇨                              ☐ View by due date

☐ Title (Task)         Summer    Get it done > ✕

☐ Title (Task)         June 20, 2009   Get it done > ✕

☐ Title (Task)         Fall      Get it done > ✕

FIG. 4B

What do you need to do?  — 201
Get new tires before road trip to Disney — 501
Add it — 502

Email reminders are set to OFF
Get bi-weekly list reminders.

Not sure where to start?
Tell us a little about you and
we can help you figure it out Print | Send | Share on: [manage my lists] [Go]

To-do
☐ View by due date
Got it done — 503
☐ Get new tires before road trip to Disney | No due date | Get it done ▾ [x]
☐ Title (Task) | June 20, 2009 | Get it done ▾ [x]
☐ Title (Task) | Fall | Get it done ▾ [x]

To-do (3)
To-buy (0)
Got it done (0)
My Quick lists ⓘ

Click here or drag over a
list item to create a
new Quick list.

View all items (3)

Need more ideas? We've got some great ones, but our community has even more!

| Recently Added | Random Selection | Editor's Top Lists | Looking for something specific? |
|---|---|---|---|
| Task name \| add (Task author, # mins ago) | Task name \| add (Task author, # mins ago) | List name | Green (100) |
| Task name \| add (Task author, # mins ago) | Task name \| add (Task author, # mins ago) | List name | Healthy home (100) |
| Task name \| add (Task author, # mins ago) | Task name \| add (Task author, # mins ago) | List name | Lifestyle (100) |
| Task name \| add (Task author, # mins ago) | Task name \| add (Task author, # mins ago) | List name | Seasonal (100) |
| | | List name | Electrical systems (100) |
| | | List name | Moving (100) |
| | | | Organization (100) |
| Refresh | Refresh | More | More |

FIG. 5

What do you need to do?

Sign in to save.
Log in or sign up now to save items to your list. Not sure where to start? Tell us a little about you and we can help you figure it out.

You add it here. We help you get it done.    [ Add it ]

To-do
Got it done ▽

To-do (3)
To-buy (0)
Got it done (0)
My Quick lists

Click here or drag over a list item to create a new Quick list.

View all items (3)

Print | Send | Share on: [manage my home ▼] Go

☐ Title (Task)                              ☐ View by due date

☐ Title (Task)                              | No due date | Get it done ▽ |  ✕

☐ Title (Task)                              | Summer | Get it done ▽ |  ✕
✎ Description
⊙ Tags ⊕ [Tag 1 ✕] [Tag 2 ✕] [Tag 3 ✕]    Due date
                                           ◉ By season   ○ On date
                            [ Add ]        ☐ Summer (09/22/09)
                                           ☑ Fall (12/22/09)          ☐ Recurring
                                           ☐ Winter (02/20/10)
                                           ☐ Spring (06/21/10)  ○ No due date
                                                    [ Save ] Cancel Need more ideas? We've got some great ones, but our community has even more!

| Recently Added | Random Selection | Editor's Top Lists | Looking for something specific? |
|---|---|---|---|
| Task name \| add | Task name \| add | List name | Green (100) |
| (Task author, # mins ago) | (Task author, # mins ago) | List name | Healthy home (100) |
| Task name \| add | Task name \| add | List name | Lifestyle (100) |
| (Task author, # mins ago) | (Task author, # mins ago) | List name | Seasonal (100) |
| Task name \| add | Task name \| add | List name | Electrical systems (100) |
| (Task author, # mins ago) | (Task author, # mins ago) | List name | Moving (100) |
| Task name \| add | Task name \| add | List name | Organization (100) |
| (Task author, # mins ago) | (Task author, # mins ago) | | |
| Refresh | Refresh | More | More |

What do you need to do?

You add it here. We help you get it done.

[ Add it ]

Sign in to save.
Log in or sign up now to save items to your list.
Not sure where to start?
Tell us a little about you and we can help you figure it out.

To-do

Print | Send | Share on: [▼ manage my home] (Go)

- To-do (3)
- To-buy (0)
- Got it done (0)
- My Quick lists ⓘ

Click here or drag over a list item to create a new Quick list.

View all items (3)

▽ Got it done

☐ View by due date

☐ Title (Task) — Summer | Building... [X]

☐ Title (Task) [X]

○ We can tell you exactly how to get this done!

☐ Title (Task) — Fall | Get it done × [X]

*(1302, 1301 callouts)*

---

Need more ideas? We've got some great ones, but our community has even more!

| Recently Added | Random Selection | Editor's Top Lists | Looking for something specific? |
|---|---|---|---|
| Task name \| add (Task author, # mins ago) | Task name \| add (Task author, # mins ago) | List name | Green (100) |
| Task name \| add (Task author, # mins ago) | Task name \| add (Task author, # mins ago) | List name | Healthy home (100) |
| Task name \| add (Task author, # mins ago) | Task name \| add (Task author, # mins ago) | List name | Lifestyle (100) |
| Task name \| add (Task author, # mins ago) | Task name \| add (Task author, # mins ago) | List name | Seasonal (100) |
| Task name \| add (Task author, # mins ago) | Task name \| add (Task author, # mins ago) | List name | Electrical systems (100) |
| | | List name | Moving (100) |
| | | | Organization (100) |
| Refresh | Refresh | More | More |

FIG. 13A

What do you need to do?

You add it here. We help you get it done.

You are in good company. 94% of members are working on their yard this month. See the top lawn and garden activities.

Sign in to save.
Log in or sign up now to save items to your list.
Not sure where to start? Tell us a little about you and we can help you figure it out!

— 1501

Add it

— 205

To-do (3)
To-buy (0)
Got it done (0)
My Quick lists ⓘ

Click here or drag over a list item to create a new Quick list.

View all items (3)

To-do
Got it done

Print | Send | Share on: [▼ manage my home] [Go]
☐ View by due date

☐ Title (Task)    Summer | Get it done > | ✗
☐ Title (Task)    June 20, 2009 | Get it done > | ✗
☐ Title (Task)    Fall | Get it done > | ✗

Need more ideas? We've got some great ones, but our community has even more!

| Recently Added | Random Selection | Editor's Top Lists | Looking for something specific? |
|---|---|---|---|
| Task name \| add (Task author, # mins ago) | Task name \| add (Task author, # mins ago) | List name | Green (100) |
| Task name \| add (Task author, # mins ago) | Task name \| add (Task author, # mins ago) | List name | Healthy home (100) |
| Task name \| add (Task author, # mins ago) | Task name \| add (Task author, # mins ago) | List name | Lifestyle (100) |
| Task name \| add (Task author, # mins ago) | Task name \| add (Task author, # mins ago) | List name | Seasonal (100) |
| Task name \| add (Task author, # mins ago) | Task name \| add (Task author, # mins ago) | List name | Electrical systems (100) |
| | | List name | Moving (100) |
| | | | Organization (100) |
| Refresh | Refresh | More | More |

FIG. 15

SYSTEMS AND METHODS FOR MANAGING TO-DO LIST TASK ITEMS TO AUTOMATICALLY SUGGEST AND ADD PURCHASING ITEMS VIA A COMPUTER NETWORK

BACKGROUND

The subject invention generally relates to computer-based list management services and, more particularly, relates to systems and method for managing to-do list task items via a computer network.

In the art, computer-based list management services are generally known. For example, U.S. Pat. No. 7,324,965, entitled "Wish List," describes a system and method for managing an on-line wish list. The described system and method allows a user to create a list of items that the user would like others to purchase for the user or a list of items that the user would like to retain for a later purchase. The system provides a user interface that allows the user to select items electronically to add to a user specific gift list. The user interface communicates through an interface component that extracts data from a number of databases, such as a merchant database, an offers database, and a products database.

Still further, U.S. Pat. No. 5,570,109, entitled "Schedule And To-Do List For Pen-Based Computer System," describes a system and method for managing a to-do list. The described system and method displays a calendar on a computer display. When a user selects at least one day on the calendar, the system displays either a schedule or a to-do list for the selected date or dates.

Additional publications that describe computer-based list management services include U.S. Publication No. 2009/0113428, entitled "Method And Apparatus For Facilitating A Location Based, Distributed To-Do List," U.S. Publication No. 2009/0094623, entitled "System And Method For Programmatically Generating To-Do List And Creating Notification Between Calendar And Other Applications," U.S. Publication No. 2007/0255593, entitled "To-Do Lists With Timer Functionality In Computerized Healthcare Environment," U.S. Publication No. 2004/0230685, entitled "Location-Based To-Do List Reminders," U.S. Publication No. 2009/0112729, entitled "Wish List Associated With Buddy List Screen Name," U.S. Publication No. 2009/0100076, entitled "Controlling And Using Virtual Universe Wish Lists," U.S. Publication No. 2009/0094260, entitled "Image-Based Wish List Population," and U.S. Publication No. 2008/0154632, entitled "Services For Increasing The Utility Of Electronic Wish Lists," as well as U.S. Pat. No. 6,680,675, entitled "Interactive To-Do List Item Notification System Including GPS Interface," and U.S. Pat. No. 7,356,490, entitled "Services For Increasing The Utility Of Electronic Wish Lists."

While the systems and methods described in these exemplary publications, which are incorporated herein by reference in their entirety, generally work for their intended purpose, the subject invention provides improvements thereto which improvements will become apparent from the descriptions that follow.

SUMMARY OF THE INVENTION

The following describes systems and methods for managing to-do list task items via a computer network. Generally, the described systems and methods provide a user interface having user interface elements for allowing a user to manage the task items where the task items are typically defined by a title, a description, a due date, and one or more tags. For managing the task items, the user interface elements allow a user to add new task items to a to-do list (with, for example, the latest addition being highlighted and placed on top of a list), delete task items that are no longer required or valid from a to-do list (with, for example, the ability to undo-delete if this happens by mistake), add details to task items in a to-do list (where the details can be used by the user to help remember what a task item is about), etc. In addition, user interface elements may be provided to allow the user to mark task items as "done" (whereupon task items marked as "done" may be automatically moved to a "completed" list), move item items from one list to another (users can drag task items between different lists to keep them organized, e.g., a task item dragged from any list into the "completed" list will automatically mark the task item as done), mark task items as public and/or private (which allows a user to choose to share one or more task items with a community or make task items private so no one else can view them), etc.

In addition to the aforementioned features, the subject invention may further allow a user to seek help in getting task items completed. For example, users may seek help directly from a community and/or experts, from content such as articles, comments from a community, and/or services and products offered for sale by a retailer as dynamically related to a task item, or the like. As noted previously, such support may be obtained by allowing the user to share to-do list task items with experts and/or a community, e.g., via a social networking Web site.

Still further, the subject invention provides the user with the ability to create customized "quick" to-do lists specific to selected task items. While not required, such "quick" lists may be separate from a user's regular to-do list. As a to-do list, a "quick" list provides the same features as a to-do list with the additional capability that a user can choose to delete all task items in a "quick" list in a single transaction or move all task items in a "quick" list back to the regular to-do list.

To assist a user in creating task items for populating their to-do list, the subject invention additionally provides a "smartbar" or the like type of user interface element by which the user can, for example, view task item ideas from experts and/or a community. In this regard, the user may seek to view or be recommended task item ideas that are related to one or more user specified preferences, e.g., task items related to a description of their home, lifestyle, etc., browse task items most recently added to the system, view random task items stored within the system, select specific task items created by editors, view task items related to maintenance tips provided by experts, view task item ideas provided by specified experts, celebrities and/or other community members that a user may want to follow, and the like.

To further facilitate the exchange of task item ideas, the system may additionally provide users with the ability to tag to-do list entered task items with keywords they deem appropriate. Such tags are then available for use in searching the system for relevant task items of other users, content, and the like thus providing a dynamic experience for users.

Yet further features may include allowing users to set due dates for task items with the system providing reminders, e.g., emails, at a predetermined time, such as a day, before a task item is due for completion, allowing users to save a link to their to-do list as a bookmark or by emailing it to themselves, and allowing anonymous or unlogged users to use almost all of the features provided with a to-do list.

While the forgoing provides a general overview of some of the various features and functionalities of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which:

FIGS. 4a and 4b illustrate an exemplary entry by a user to the to-do list task item management services;

FIG. 5 illustrates an exemplary method by which a user may create a to-do list task item;

FIG. 6 illustrates an exemplary method by which a user may view and edit a to-do list task item;

FIG. 8 illustrates an exemplary method by which a user may be recommended to-do list task items for inclusion in a to-do list;

FIGS. 10a, 10b, and 10c illustrate an exemplary method by which a user may create and add to-do list task items to a "quick" list;

FIGS. 13a-13c illustrate an exemplary method by which a user may access resources to assist the user in getting a to-do list task item completed;

FIG. 15 illustrates an exemplary method by which a user may be presented with contextually related messages and/or access social components.

DETAILED DESCRIPTION

Figure 1:
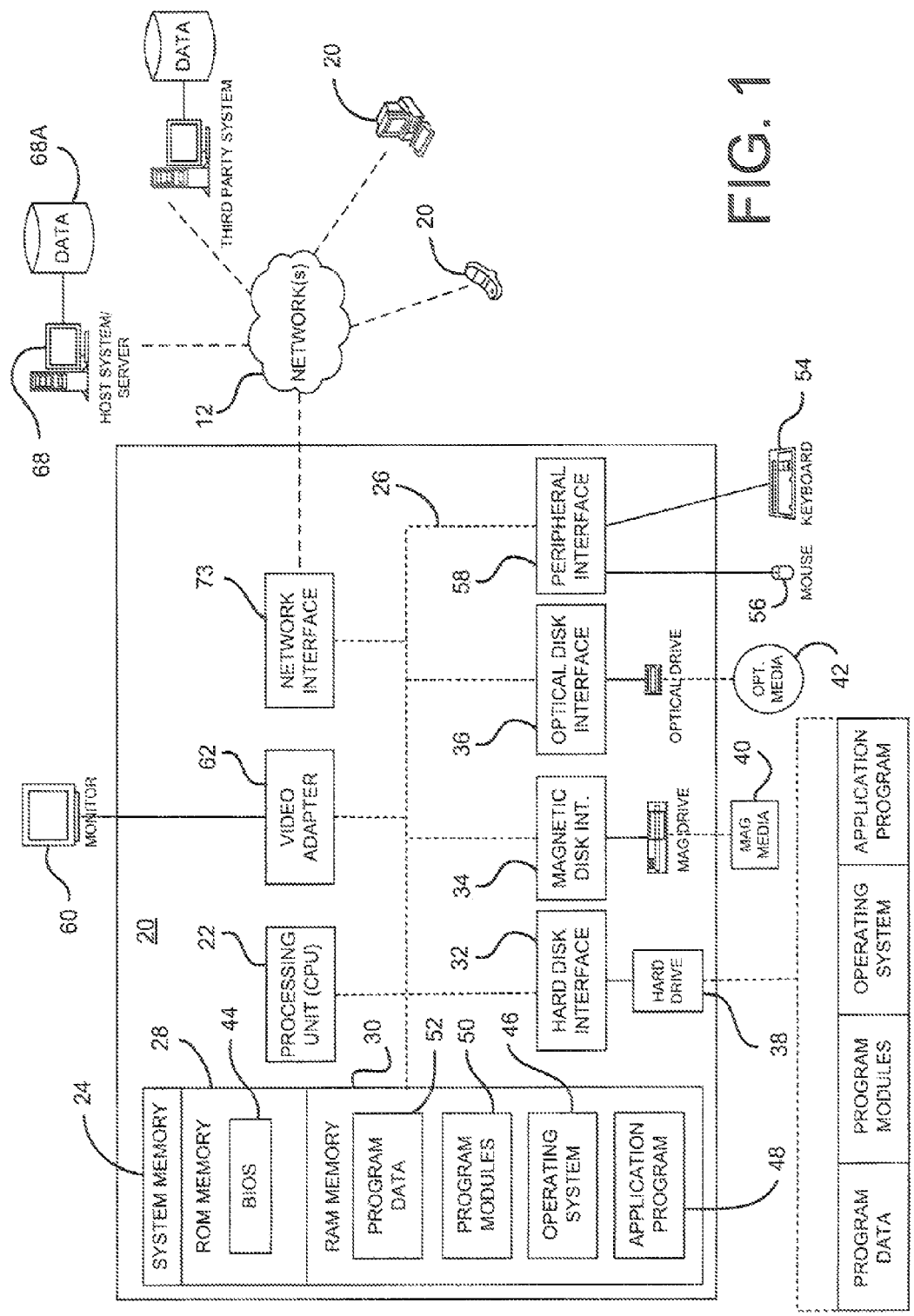
FIG. 1 illustrates in block diagram form components of an exemplary, online, retail, computer network environment.

With reference to the figures, the following describes various systems and methods for managing to-do list task items. To this end, a processing device 20, illustrated in the exemplary form of a computer system, is provided with executable instructions to, for example, provide a means for a user, e.g., a consumer, to access a host system server 68 and, among other things, manage task items placed into one or more to-do lists, view content, share content, order items, schedule and/or manage delivery of ordered items, schedule and/or manage pick-up of ordered items, and the like. Generally, the computer executable instructions reside in program modules which may include routines, programs, objects, components, data structures, etc. that perform particular tasks or implement particular abstract data types. Accordingly, those skilled in the art will appreciate that the processing device 20 illustrated in FIG. 1 may be embodied in any type of device having the ability to execute instructions such as, by way of example, a personal computer, mainframe computer, personal-digital assistant ("PDA"), cellular telephone, or the like. Furthermore, while described and illustrated in the context of a single processing device 20, those skilled in the art will also appreciate that the various tasks described hereinafter may be practiced in a distributed environment having multiple processing devices linked via a local or wide-area network, such as the Internet, whereby the executable instructions may be associated with and/or executed by one or more of multiple processing devices.

For performing the various tasks in accordance with the executable instructions, the processing device 20 preferably includes a processing unit 22 and a system memory 24, which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a touch pad or keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via the network 12 and, via such connections, will be associated with data repositories that are associated with such other third party systems. Such third party systems may include, without limitation, systems of banking, credit, or other financial institutions, systems of third party providers of goods and/or services, systems of shipping/delivery companies, systems that support social networking, etc.

For performing tasks as needed, the host system server 68 may include many or all of the elements described above relative to the processing device 20. In addition, the host system server 68 would generally include executable instructions for, among other things, providing a graphical user interface for managing to-do list task items, making content available to users, allowing content to be shared amongst users, making items available for purchase, handling search requests, providing search results, accessing pricing information related to items, accessing inventory and item availability data, providing a means for the user to schedule and/or manage orders for delivery and facilitating any such delivery of ordered items, providing a means for a user to schedule and/or manage orders for pickup and facilitating any such pickup of ordered product, and the like. Communications between the processing device 20 and the host system server 68 may be exchanged via a further processing device, such as a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the host system server 68.

Figure 2:
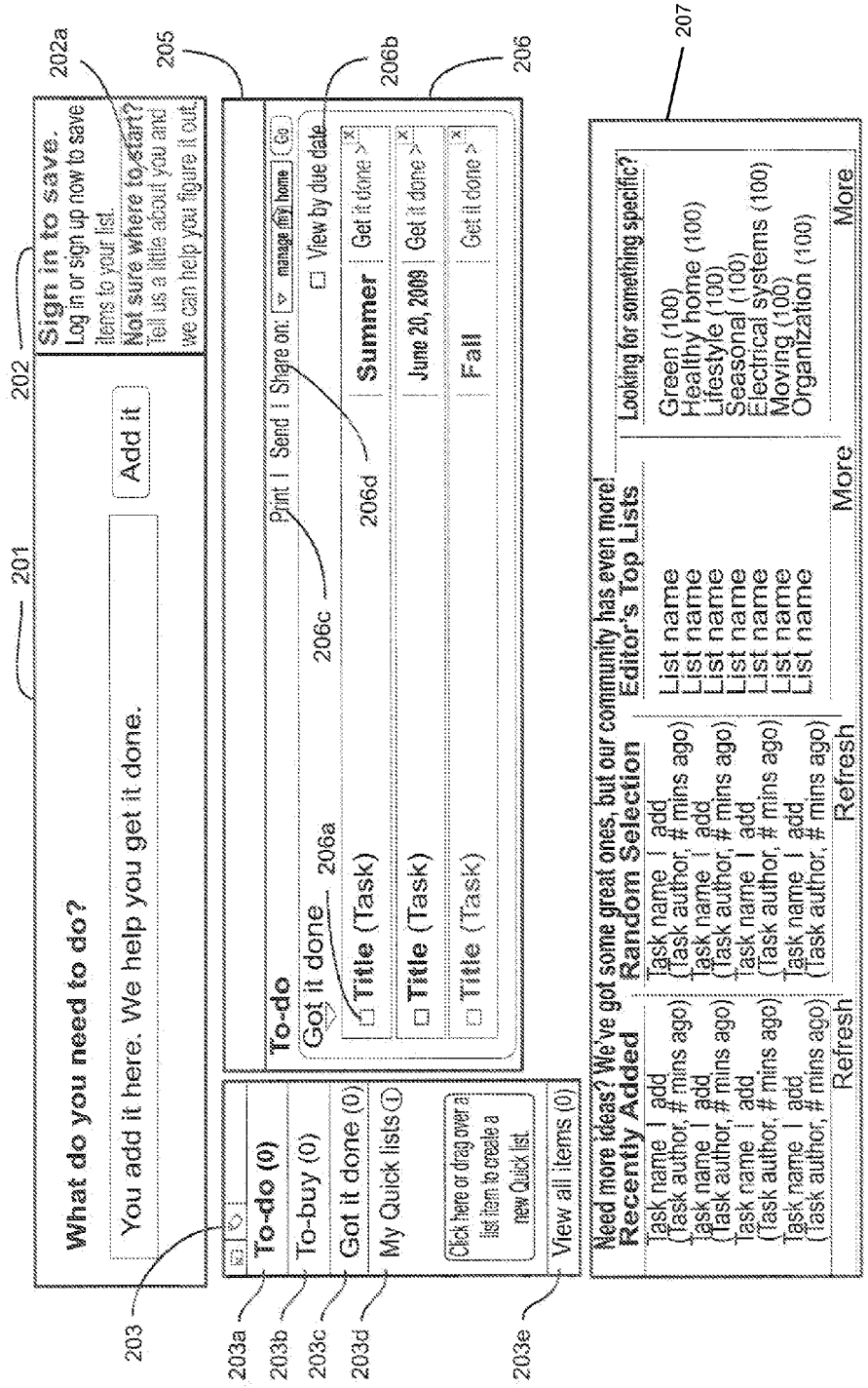
FIG. 2 illustrate various exemplary tools for use in managing lists of to-do list task items.

For allowing a user to setup and/or manage to-do task items, the host server system 68 may make available to the user one or more tools by which a user can, for example, interact with graphical user interface elements to create and manage one or more lists of task items, share task items with a community, search task items and related content, obtain task item ideas, etc. By way of example only, FIG. 2 illustrates a screen shot of various to-do list management tools that may be provided to a user at user computer 20 via the host system server 68.

As illustrated, the to-do list management tools may include an add area 201, by which a user can add a task item to their to-do list; a sign-in area 202 that allows the user to log-in to the system to view already created lists (if any) and which may also provide a link 202a that the user can activate to cause the display of steps to get the user started; a list view area 203 having links, which the user can activate to cause a display of various lists created by the user (such as a link 203a to their to-do list, a link 203b to their to-buy list, a link 203c to their "completed" list, a link 203d to their "quick" list(s), a link 204e to cause a display of all task items, or the like; a message area 205, by which system messages can be displayed to the user; a list display area 206 for displaying task items in the currently selected list (e.g., displayed as a result of interaction with the links in area 203) including elements 206a for marking a task item as done, 206b for sorting task items (such as by due date), 206c for printing the displayed list of task items, 206d for sharing the displaying list of task items with others, etc.; and an area 207 for accessing task item ideas created by others, such as task items recently added to the system, random task items, task items created by editors or experts, and/or task items grouped by subject matter. It is to be appreciated that these tool areas need not be displayed concurrently or in the exact manner shown in FIG. 2 and that variations may be made thereto as desired.

Figure 3:
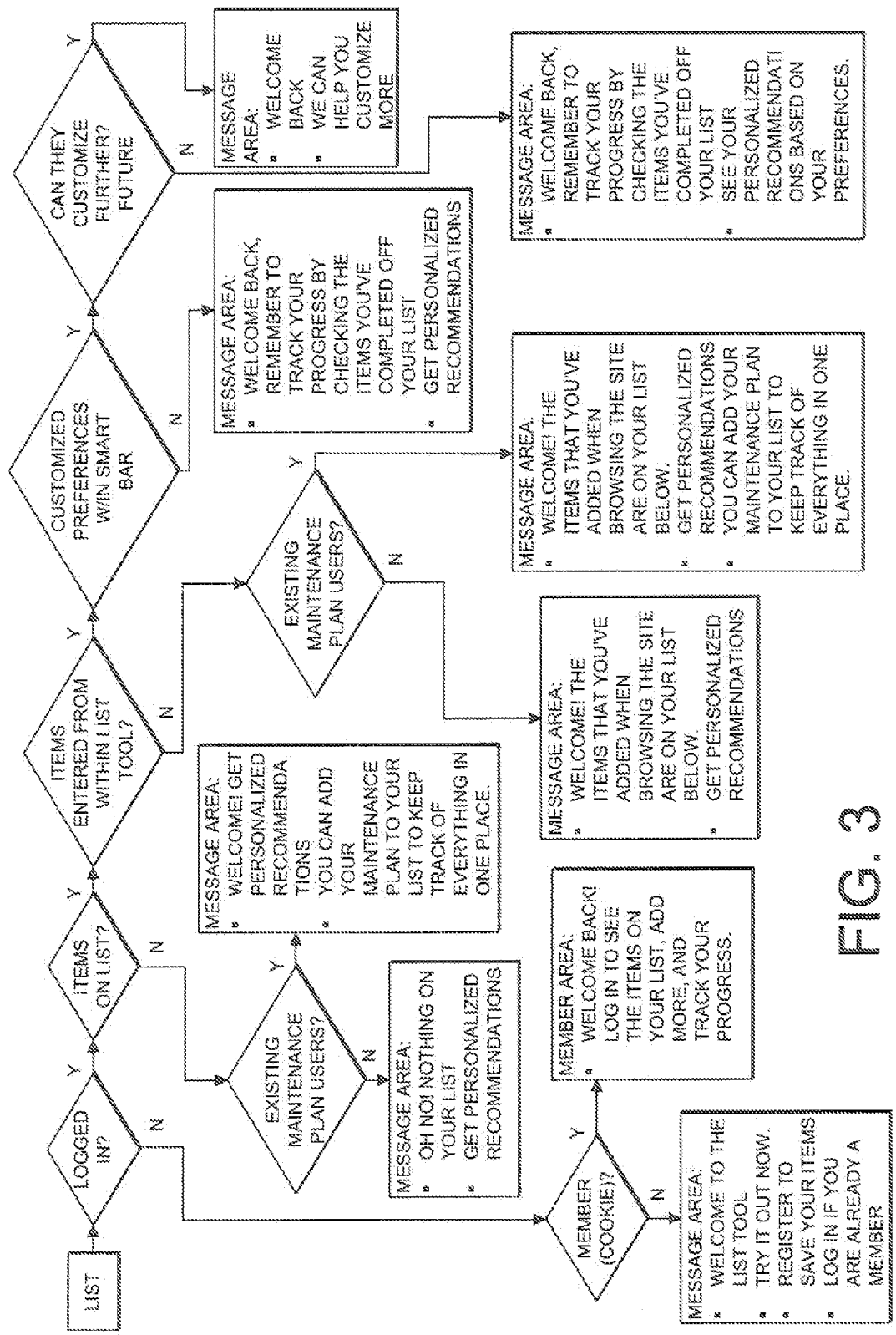
FIG. 3 illustrates a flow chart diagram of an exemplary method by which the various tools of FIG. 2 may be accessed.

More particularly, once the user navigates to the to-do list management application that is hosted on the host server system 68, a determination may be made as to whether or not the user is currently logged into the system as is illustrated in FIG. 3. If the user is not logged into the system and it is not indicated to the system that the user has otherwise previously used the to-do list management tools, which indication may be stored in a cookie stored on the user computer 20, the user may be provided with a welcoming message and directed to an area 202 where the user may, as noted previously, access a log-in procedure and/or request an overview of the system. When the user is logged into the system, the system would next determine if that user has already created any task item lists and, if so, display those task items in an area 206, preferably in accordance with any preferences that may have been previously set by the user. In the event that the user comes to the to-do list application and the lists for that user currently fail to have any task items, i.e., the user is not logged in, is a new user, or the like, the user may be presented with a screen such as illustrated in FIG. 4a-4b.

Turing now to FIGS. 4a and 4b, when any user comes to the to-list application without having set any task items, the user may be presented with a message area 401 which functions to, for example, inform the user that their to-do list is empty, instruct the user how to add task items to their lists, and provide an overview of the system functionality. In addition, the user may be prompted via area 402 to provide information, for example by means of answers to questions, that can be later used by the system to provide task item recommendations to the user. The information provided by the user can also be used by the system to place the user into a community of users that have characteristics similar to the user and, as such, the mechanism for allowing a user to provide information to the system for this purpose may be made available to the user throughout the user experience. It will be appreciated that, for the convenience of returning users, a user may elect to simply skip these steps.

To add task items to a to-do list, a user may generate their own task items and/or select from pre-existing or already created task items. For populating a to-do list with their own task items, a user merely types into the text entry field 501 of the add area 201 a desired title for the task item, e.g., "Get new tires before road trip to Disney," and then clicks on the "add it" icon 502, hits a keyboard "return," or the like as illustrated by way of example in FIG. 5. When the user has completed entry of a task item in this manner, the task item will be moved to the to-do list and will be displayed as the top listed task item in the to-do list as shown in area 503. When new task items are added to a to-do list in this manner the due date is preferably defaulted to "no due date" and the add item area 201 preferably remains in focus to allow the user to quickly continue to add task items to their list. While the foregoing allows any user to quickly create a to-do list, a logged-in user of the system may further be provided with the ability to edit and save task items that have been added to their to-do list and/or activate reminders for task items (e.g., be sent an email reminder a predetermined time before a given task item is due).

Turning now to FIG. 6, to edit a task item a user may simply double click on a task item shown in display area 206 whereupon the system will function to expand the task item to show the details for the selected task item. Specifically, via the task item editing tool, the user may edit the title 601 given to the task item, set a due date 602 for the task item, enter a description 603 for the task item, and/or provide tags 604 for the task item.

With respect to setting a due date for a task item, the system may allow a user to, for example, set the due date to a date specific (via entry of the date or interaction with a calendar) or set the due date as seasonal. In the event that a user selects multiple seasonal due dates, the system may create separate task item entries for the particular task item in the to-do list to thereafter call out to the user the different seasonal due dates. With seasonal due dates, the system may further take into account (for example when notifying a user of a due date) that seasons may vary depending upon the user's location, such as indicated by their zip code. In some instances the user may specify to the system that a due date is to be recurring in which case, when a task item is indicated as completed or time has past for the performance of the task item, the task item will be again presented to the user within the to-do list with the next recurring due date being shown for the task item. Due dates may also be automatically designated by the system as recurring.

Figure 7:
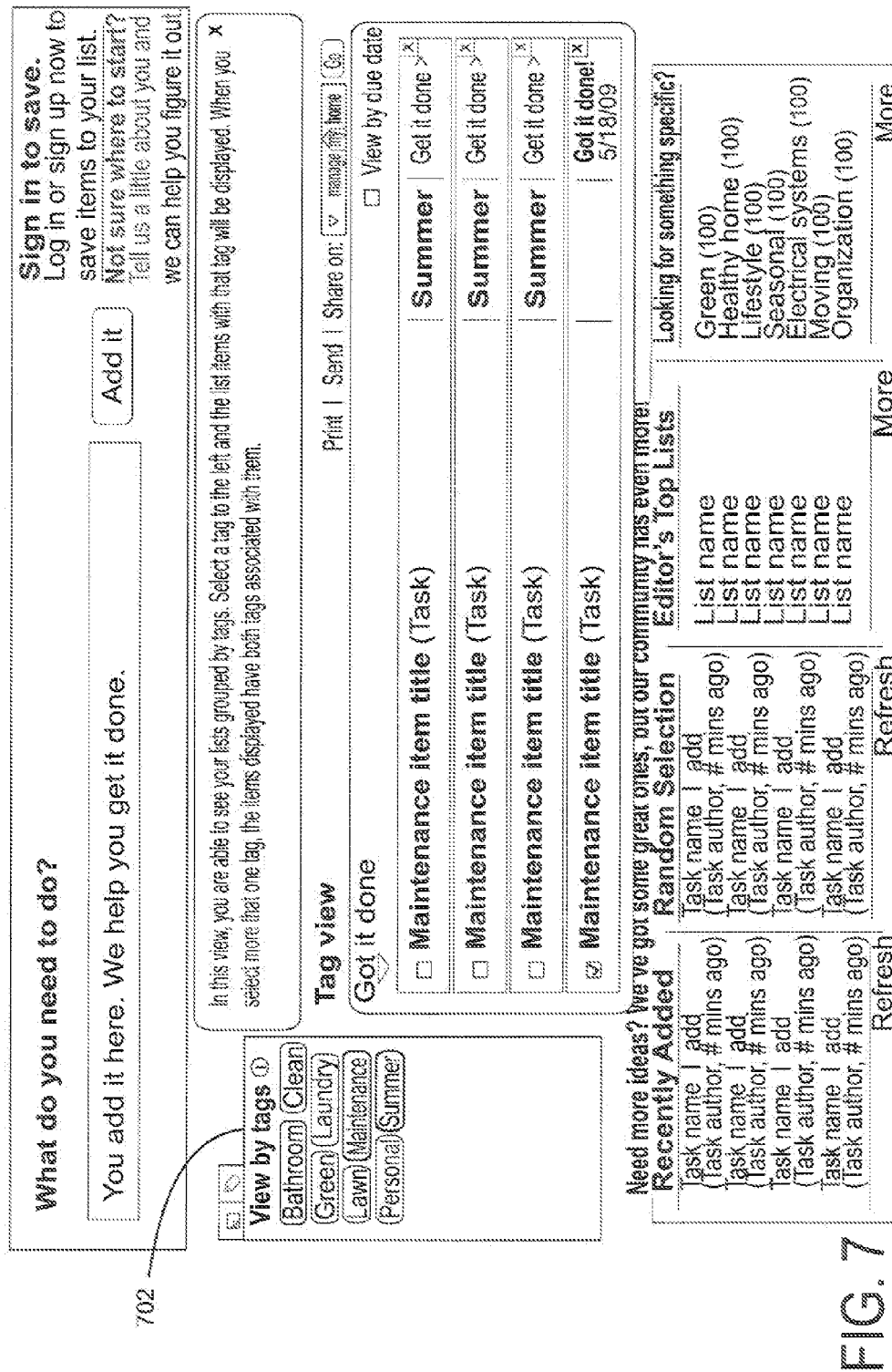
FIG. 7 illustrates an exemplary method by which a user may view to-do list task items filtered by tag information.

With respect to setting tags for a task item, a tag is a keyword or term that is assigned to a task item to help organize task items for the user and within the system. For example, as shown in FIG. 7, a user can change from viewing task items based on a list they are currently viewing to viewing task items that have been provided with one or more selected tags. To this end, a tag selection area 702 may be provided which presents to the user for selection a listing of all tags that have been assigned to their task items. Task items that are displayed in response to a user selecting one or more tags displayed in selection area 702 should include only those task items that include all of the tags so selected. For example, if a user selects both the "maintenance" and "summer" tags in selection area 702, the task items displayed to the user will be those task items that include both of the tags selected and, if no task items include both of the tags selected, the user will be so informed and/or the task item list will be displayed with no task items. When task items are displayed to the user in this manner, the task items are preferably sorted by due date with task items that have been indicated to have been completed shown at the bottom of the listing. When a user is providing tags to task items when editing task items as shown in FIG. 6, the system may use predictive typing technologies whereby previously created tag names can be displayed to the user for ease (and consistency) of entry.

With respect to the description field, the description field is provided to present to the user a reminder of what the task item is intended to be or accomplish. The description field may be user editable and/or may be auto populated using pre-created text that is, for example, associated with one or more keywords found with the task item title or which have been pre-assigned to previously created task items that were selected by the user for use in their to-do list.

Figure 8:
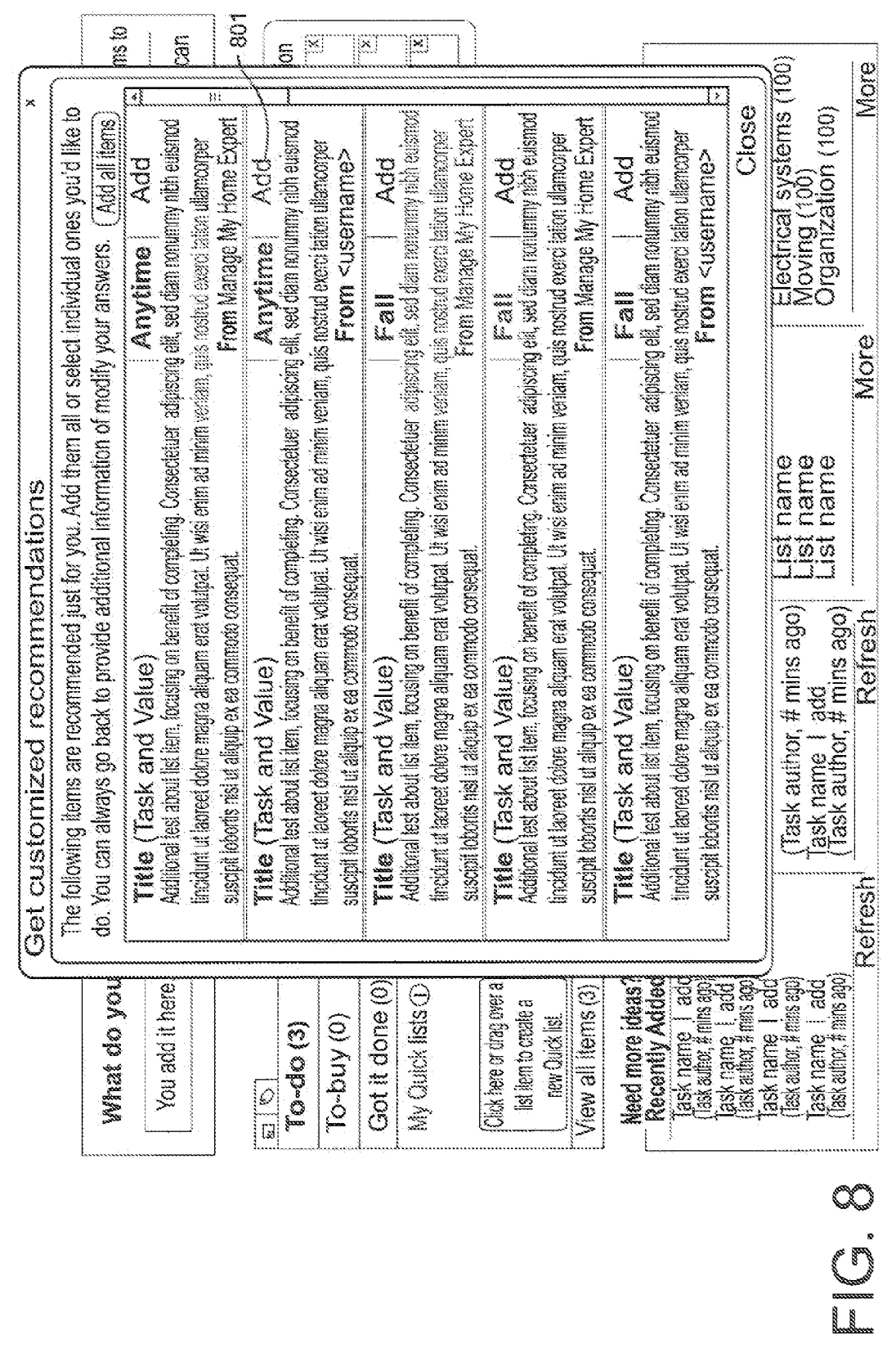

As noted above, a user may select from pre-created task items to add task items to their to-do list. As illustrated in FIG. 2, such pre-created task items may include task items that were recently added to to-do lists by other users, task items randomly selected from to-do lists of other users, task items created by experts, task items selected by editors, or the like. In addition, a user may search for pre-created task items based upon tags associated with those task items, e.g., "green," "healthy home," etc. Still further, as illustrated in FIG. 8, a user can request to view task items that are recommended for that user. In this regard, task items that are recommended to a user can be task items that have been created by other users within the same community as the user, pre-created task items that share tags with task items within the user's to-do list, pre-created task items that are related to products the user has indicated a desire to purchase (e.g., products included within the user's to-buy list), or the like without limitation. Preferably, the recommended task items are filtered to prevent a user from being presented with a task item that is already found in their to-do list. The displayed task items may also provide an indication as to the number of other users within the system that have included the task item within their to-do list. In the event that a user views a pre-created task item that is of interest to the user, the user may simply activate a corresponding "add" icon 801 to cause the task item to be added to their to-do list.

Figure 9:
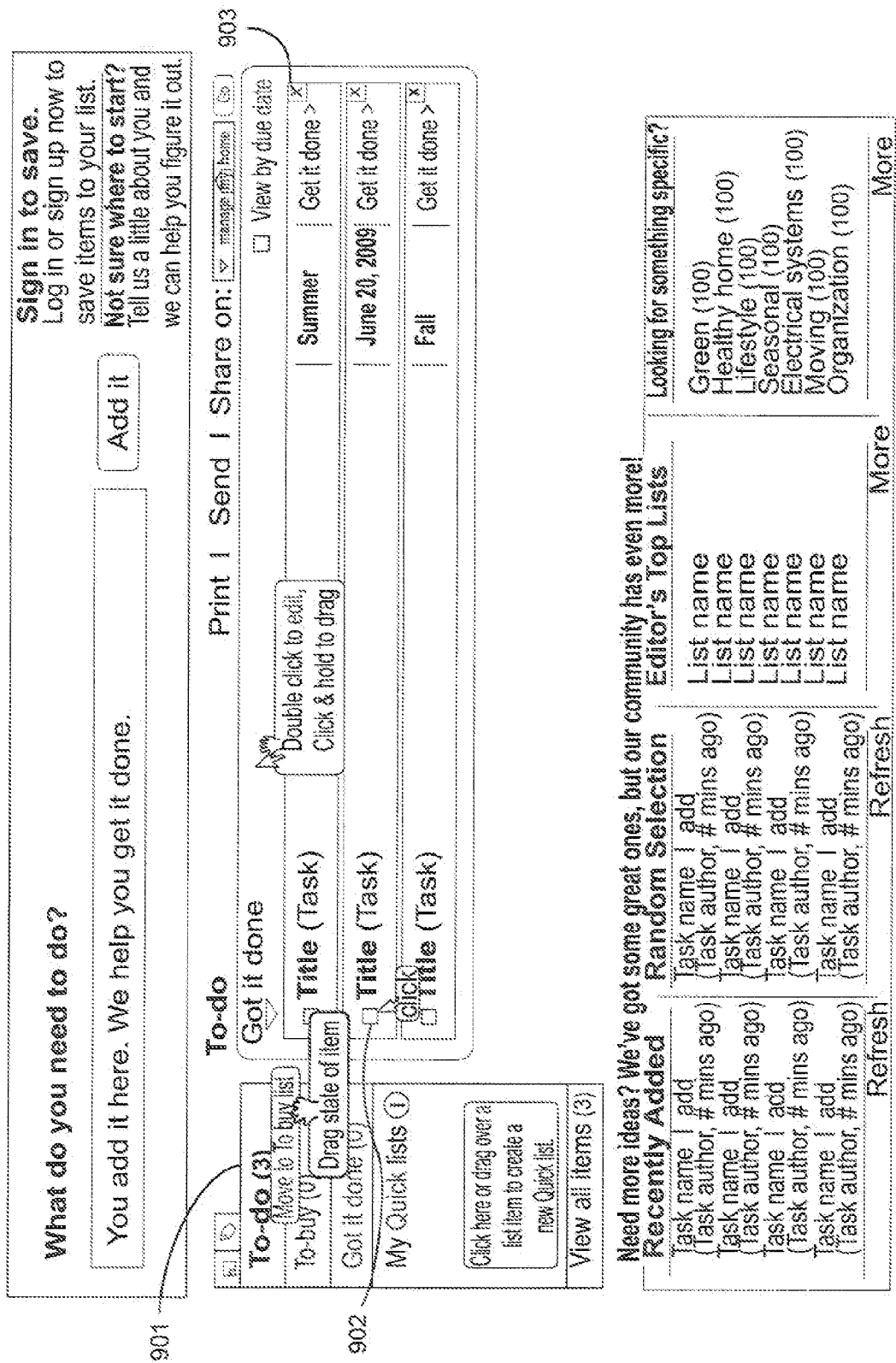
FIG. 9 illustrates an exemplary method by which a user may move to-do list task items between lists.

For allowing a user to further manage task items that have been placed within a list, the system additionally provides a user with the ability to move items within a given list and/or between lists. For example, as illustrated in FIG. 9, a user may single click on a task item to hold and drag the task item from one location within a displayed list to another location within the same list. If, however, the displayed list has been sorted by due date, it is preferred that the user not be able to change the ordering of the task items as presented in the display. In addition, a user may single click on a task item to hold and drag the task item from one listing, e.g., a to-do list, to another list, e.g., a "completed" list. When the user drags and then drops a task item from one list to another list, it is preferred that the numbers 901 that serve to indicate the total number of task items within each list be updated to reflect the removal of the task item from the list from which it was dragged and the addition of the task item to the list in which it was dropped. A user may also simply move an item from a list to the "completed" list by simply clicking on the corresponding "got-it-done" or "done" icon 902 associated with the completed task item. As before, the removal of a task item from the currently being viewed list to the "completed" list as a result of the user activating the corresponding "got it done" icon 902 will be reflected in the numbers 901 that serve to indicate the total number of task items within each list. A task item may also be removed from a list by selection of a "delete" icon 903. A confirmation request may be provided to a user to confirm the user's desire to move task items between lists or to delete a task item.

Figure 10A:
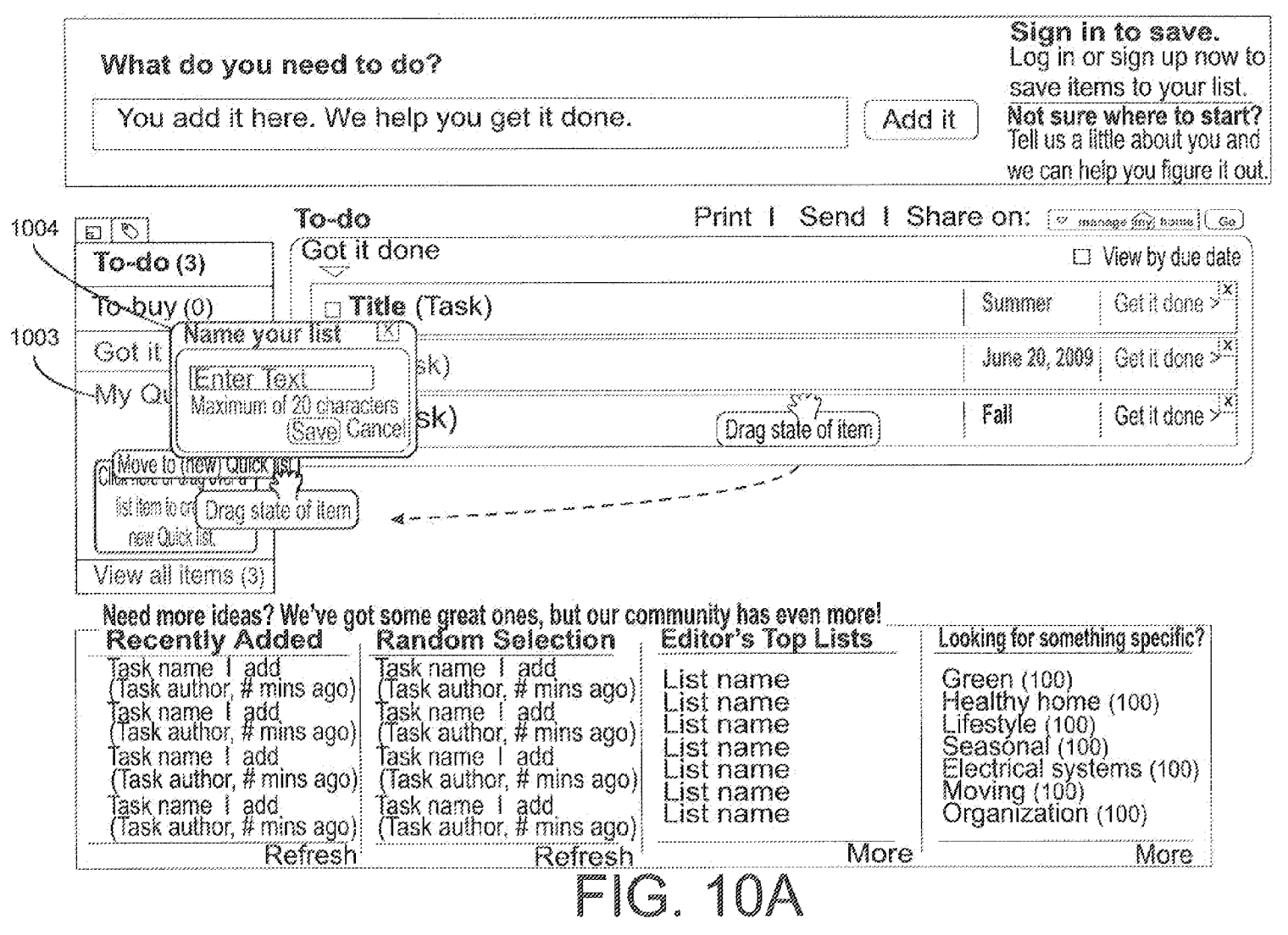
Figure 10C:
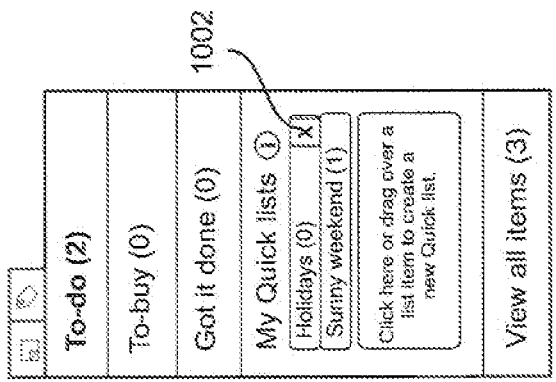
Figure 10B:
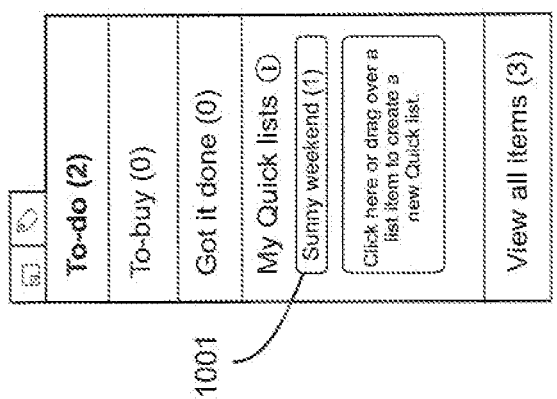

In addition to the to-do list and the "completed" list of task items, the system may still further provide a user with the ability to create one or more "quick" lists. As illustrated in FIG. 10a, a "quick" list may be created by a user dragging and dropping a task item from their to-do list to the "my quick lists" link 1003 whereupon the user will be prompted 1004 to provide a name for the to-be created "quick" list. After the user creates the "quick" list, the created "quick" list will appear and will include an indication 1001 that the task item was moved thereinto as shown in FIG. 10b. When multiple "quick" lists are created, the "quick" lists can be presented to a user via use of a drop down menu as shown in FIG. 10b. In addition, task items placed within a "quick" list can be edited as described above and, by double clicking on a "quick" list title, the "quick" list title may also be edited by a user. Still further, a user interface element 1002 may be provided to allow a user to quickly delete a previously created "quick" list. Deletion of a "quick" list may cause task items to be removed from all user lists, may cause uncompleted task items to be automatically moved back to the to-do list, and/or may cause completed task items to be automatically moved to the "completed" list without limitation.

Figure 11:
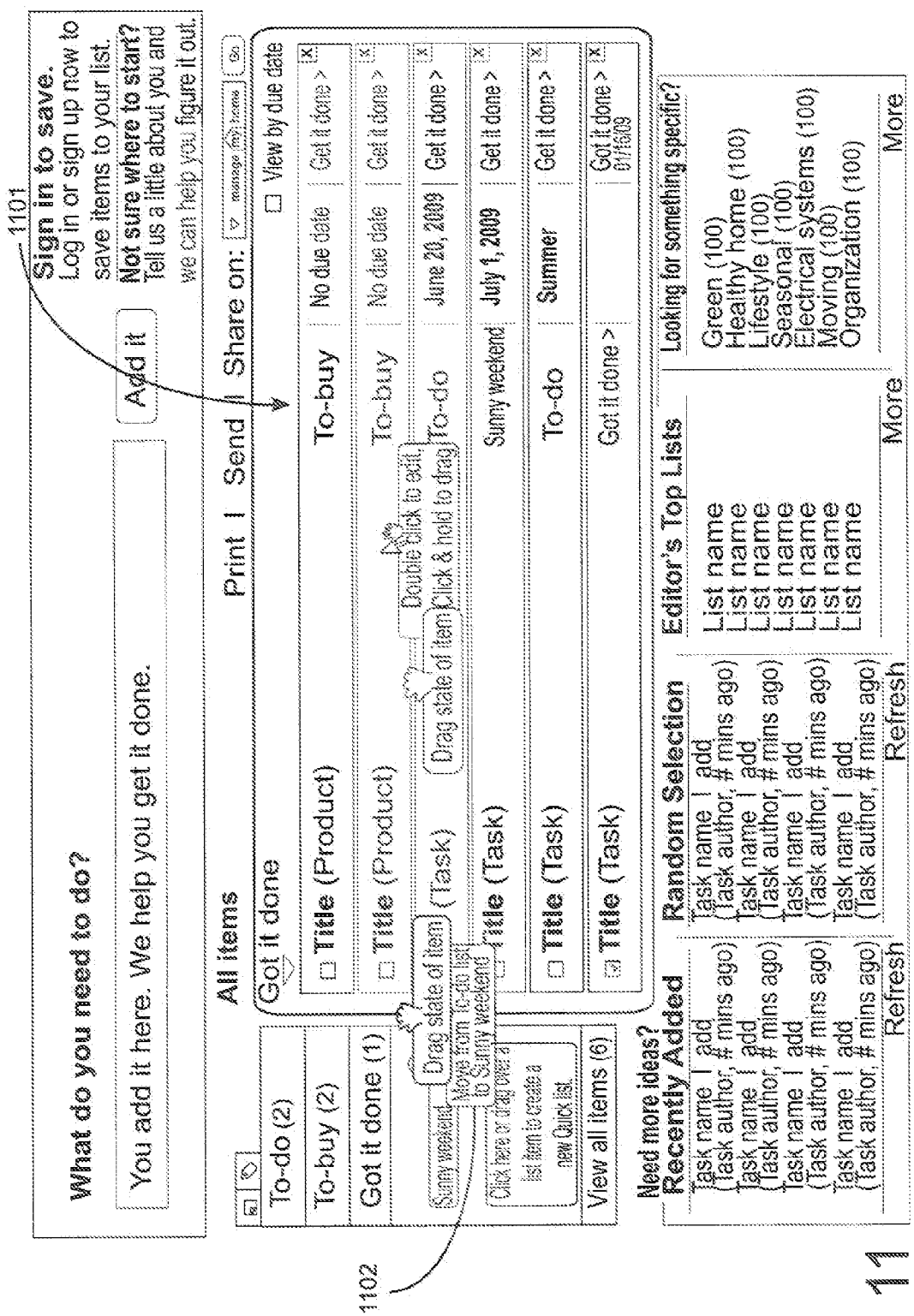
FIG. 11 illustrates an exemplary method by which a user may view and edit all to-do list task items.

A still further list option that may be provided as a feature of the to-do list application is an "all" list. As illustrated in FIG. 11, when the user selects to view "all" task items, the page will refresh to show all task items from all created lists in a single view. When the item tasks are presented to the user in the "all" view, an additional field 1101 may be included with each task items to show the list to which that task item currently belongs. As described above, a user may edit task items, delete task items, click, drag, and drop task items within the "all" view list to change the order in which the task items are presented, and may also click, drag, and move task items between lists. When a task item is deleted from the "all" view, the task item is also deleted from the list to which the task item currently belongs and the number of task items within that list as displayed to the user is accordingly adjusted. Similarly, when a task item is moved to another list by a drag and drop operation, the field 1101 for that item will be updated to show the list to which the item belongs as a result of the move operation and the indicated number of task items within the list from which the task item was moved and to which the task item was moved will be adjusted accordingly. As before, a visual cue 1102 can be provided to the user to assist the user in any drag and drop operation, e.g., the user can be informed of the result should the user drop the task item in its currently dragged to location. A user may also add task items while in the "view" all display as described above. When a task item is added in this manner, the task item may be defaulted to belong to the to-do list.

Figure 12:
FIG. 12 illustrates an exemplary method by which a user may view and edit to-do list task items that have been indicated as being completed.

An exemplary view of the "completed," i.e., got-it-done, list is illustrated in FIG. 12. As described previously, task items that have been marked as "done" may be automatically moved into this list. Task items moved to the "completed" list may be provided with a time stamp 1201 which indicates when the task item was moved into this list. A check box element 1202 may also be provided which, when unchecked by the user, will cause the task item to be automatically removed from the "completed" list and returned to the to-do list. An additional element 1203 may be selected by the user to delete the corresponding task item. As before, when a task item is deleted or moved between lists, the user can be asked to confirm the operation and, once confirmed the requested action will be performed and the displayed number 1204 which indicates the number of task items within the relevant lists will be accordingly updated.

Figures 13B, 13C:
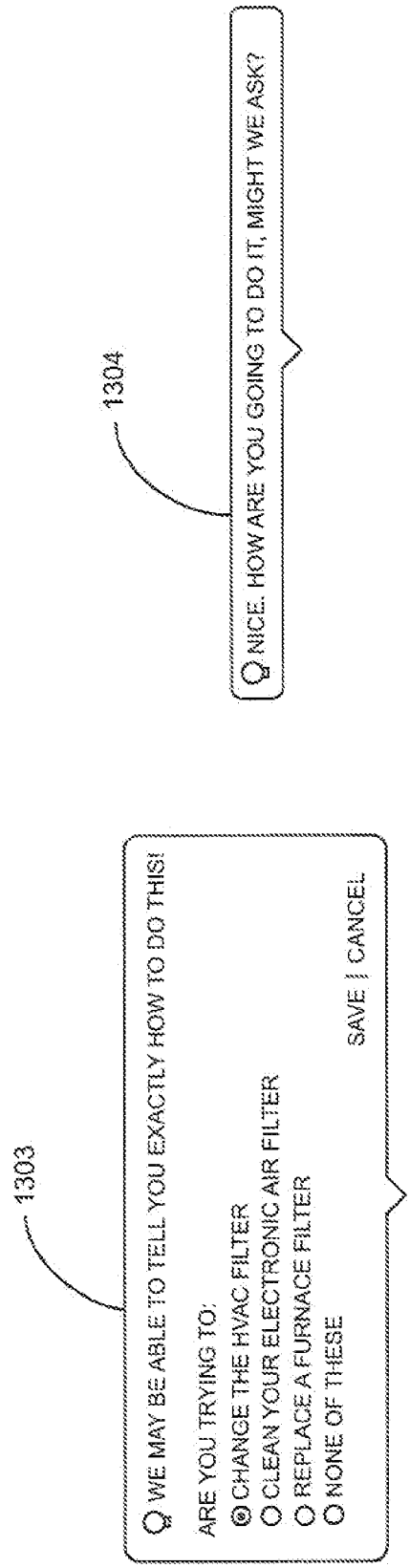

To help a user move task items from a to-do list to the "completed" list the task items may additionally include a "get it done" link 1301 which can be activated by the user to gain access to products for purchase, suggestions, or the like that are related to the corresponding task item as illustrated in FIG. 13a. When a user mouses over the link 1301a pop-up message 1302 can be displayed to inform the user what this link does. By way of further example, in the event that a user activates the "get it done" link 1301 for a task item that was added to the to-do list from task items created by editors or the like associated with the host system, the system may present to the user pre-created questions, suggestions, and/or solutions that have been created for that known task item as shown in pop-up 1303 of FIG. 13b. In the event that the user activates the "get it done" link 1301 for a task item that was added to the to-do list by means of the add task item area, the system may examine the title, description, and/or tags associated with the corresponding task item to search for recognized keywords and provide to the user pre-created questions, suggestions, and/or solutions that have been mapped to those keywords. In the event that the system cannot provide any questions, suggestions, and/or solutions, the system may prompt the user for additional information, as illustrated by pop-up 1304 of FIG. 13c, and the system may use the user provided information to update its knowledge base, e.g., it may associate any user provided suggestions and/or solutions with keywords found in the corresponding task item title, description, and/or tags for later provision to other users in response to future requests for help.

Figure 14:
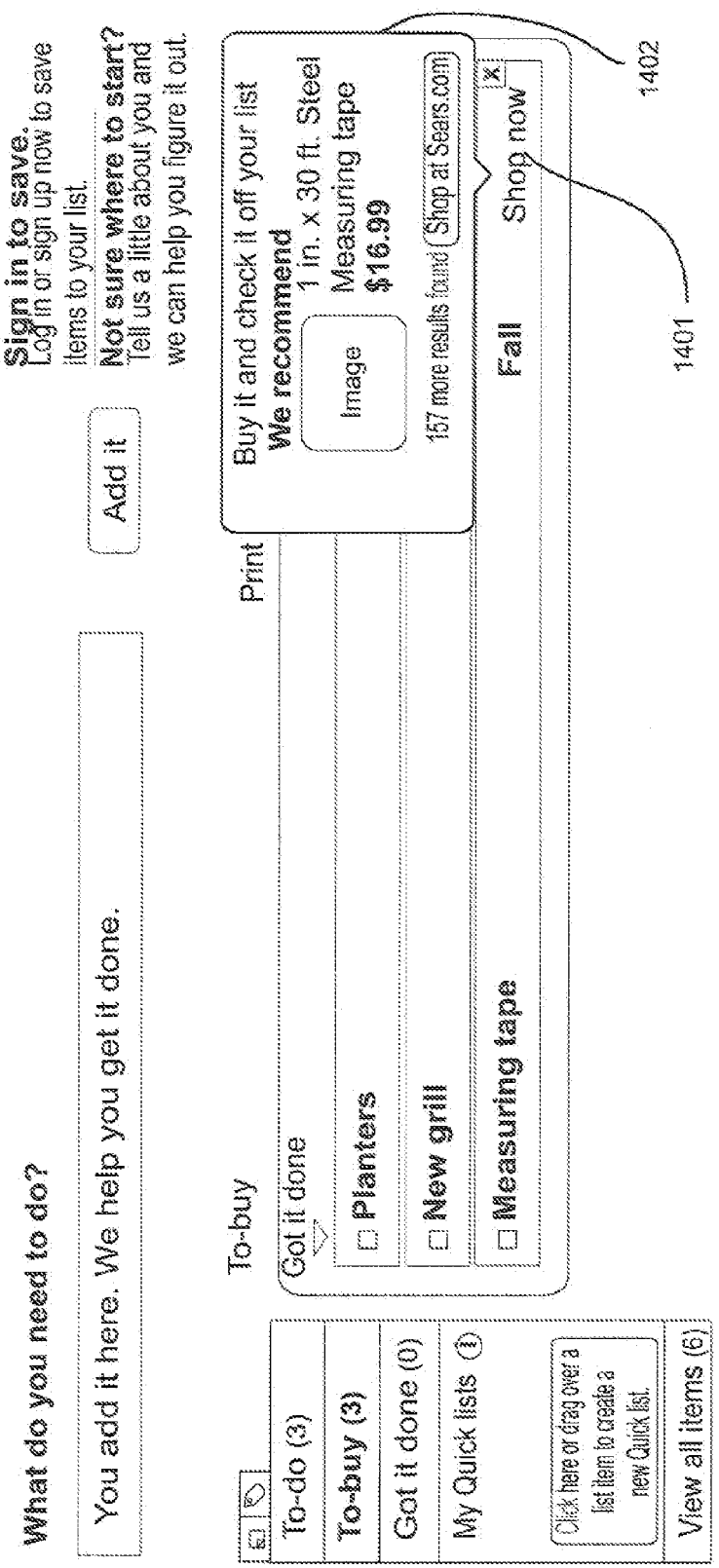
FIG. 14 illustrates an exemplary method by which a user may view, edit, and access product related to to-do list task items.

Considering now FIG. 14, the task item management service may yet further provide the user with the ability to add task items to a "to-buy" list. In this regard, while the "to-buy" list functions as a shopping list, task items in the "to-buy" list may be moved to the "to-do" list and vice versa. When a task item is placed into the "to-buy" list, instead of providing the user with the functionality associated with the "get it done" link, the system will provide the user with the ability to purchase the item via activation of a "shop now" link 1401. More particularly, in response to a user activating the "shop now" link 1401, the system may present to the user a pop-up 1402 in which is presented one or more items than can be purchased as related to the task item corresponding to the link so activated. To this end, the system may use product information that was pre-mapped to the corresponding task item and/or examine the title, description, and/or tags associated with the corresponding task item to search for recognized keywords and provide to the user product purchasing options that have been mapped to those keywords. In the illustrated example, the pop-up 1402 includes an image of a recommended product, a description of the recommended product, and a link to a vendor whereby the product may be purchased. In the event that the vendor is in communication with (or the same as) the host system, if the product is purchased by the user the corresponding task item can be marked as "done" and automatically moved to the "completed" list.

To provide social aspects to the task item list management services, the system may additionally utilize the messaging area 205 to, for example, display community oriented information as illustrated in FIG. 15. In this example, considering one or more task items in a to-do list of the user, the messaging area 205 can be used to provide related factual data. As before, the system may examine the title, description, and/or tags associated with the task item(s) to search for recognized keywords and provide to the user one or more messages that have been mapped to those keywords. In a similar manner, the system may also present to the user a link 1501 which the user can activate to view other task item ideas that are contextually related to task item(s) within their to-do list. Still further, the messages/links presented in the messaging area can be contextually related to the profile of the user considering, for example, the questions answered and information provided by the user during the procedure above described. As was also noted above, by activating link 206d the user can elect to share with a community, i.e., publish, task items that have been placed within a list. Before a list of task items is published to a community, the user will have the ability to edit the list and add and/or remote task items thereto and therefrom, respectively.

Figure 16:
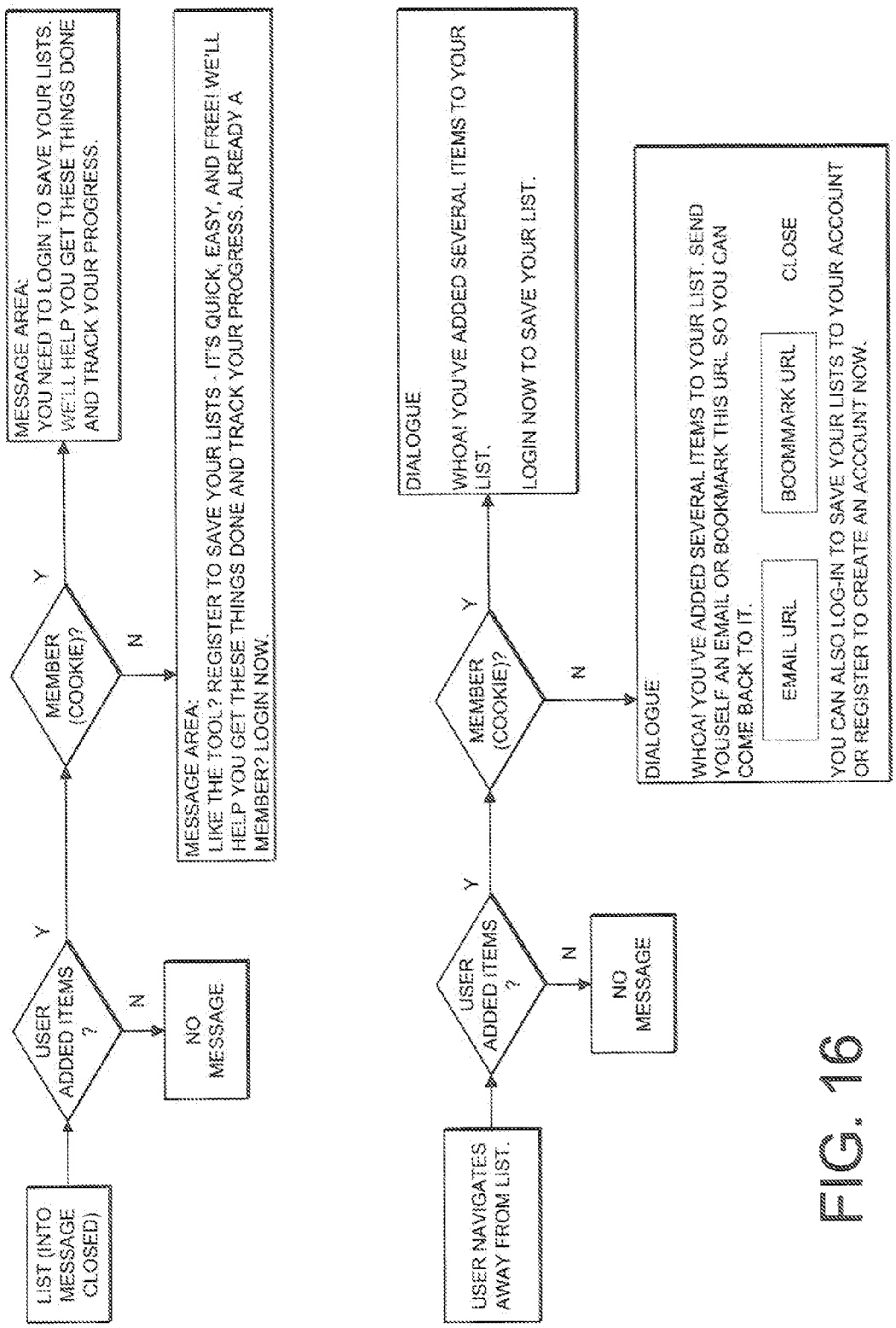
FIG. 16 is a flow chart illustrating exemplary actions taken by the system upon a user leaving the to-do list management services.

When a user has finished interacting with the task item management services provided by the host system server 68, the user may, if not already logged in, be prompted to log-in or create an account with the host system server 68 as illustrated in FIG. 16. Regardless of whether or not the user has created an account with the system, the system can function to store on the user's computer 20 any created list information, e.g., in a cookie, whereby the user's lists can be recreated upon the user returning to the task item management services. To assist the user in such a return, upon the user leaving the task item management services, the system may prompt the user to bookmark or email to themselves a link to the task item management services.

While various concepts have been described in detail, it will be appreciated by those skilled in the art that various modifications and alternatives to those concepts could be developed in light of the overall teachings of the disclosure. For example, it will be appreciated that the subject system and method could be used to manage to-do task items associated with a maintenance plan. Still further, while various aspects of the invention have been described in the context of functional modules, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person knowledgeable in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transitory computer-readable media having stored thereon computer executable instructions which, when executed by a processing device, perform steps for allowing a user to manage to-do list task items, the steps comprising:

providing a user interface comprising user interface elements for allowing the user to add one or more task items to a to-do list, for allowing the user to add, to the to-do list, one or more task items from a list of task items shared by other users from an online social network, for allowing the user to edit one or more fields associated with a task item added to the to-do list, and for allowing the user to designate a task item within the to-do list as completed whereupon the designated task item is placed into a completed list and removed from the to-do list, without further user intervention;

in response to a task item being added to the to-do list, causing a purchasing task indicative of a need to purchase a product for use in connection with performance of the task item to be automatically added to the to-do list, without further user intervention;

in response to a user interaction with the purchasing task item within the to-do list, causing a pop-up window to be automatically displayed, wherein the pop-up window includes a link to an on-line vendor of product, from which a product needed to perform the purchasing task is purchasable;

in response to the product being purchased from an on-line vendor of the product, causing the purchasing task to be automatically placed into the completed list and removed from the to-do list, without further user intervention; and wherein a task item is defined by at least a title, a description, a due date, and a tag.

2. The non-transitory, computer-readable media as recited in claim 1, wherein the instructions provide for task items displayed within the to-do list to be filtered via use of the tag.

3. The non-transitory, computer-readable media as recited in claim 1, wherein the instructions provide for the user to manually key in a new task item for adding the new task item to the to-do list.

4. The non-transitory, computer-readable media as recited in claim 1, wherein the instructions present to the user pre-created task items which pre-created task items are selectable by the user for automatically adding to the to-do list.

5. The non-transitory, computer-readable media as recited in claim 4, wherein the pre-created task items are provided for selection by the user as a function of a community in which the user is placed.

6. The non-transitory, computer-readable media as recited in claim 5, wherein the user is placed into a community as a function of user specified characteristics.

7. The non-transitory, computer-readable media as recited in claim 4, wherein the pre-created task items are provided to the user for selection by the user as a function of one or more tags of task items already placed by the user within the to-do list.

8. The non-transitory, computer-readable media as recited in claim 1, wherein the user designates a task item as done by dragging and dropping the task item from the to-do list to the completed list.

9. The non-transitory, computer-readable media as recited in claim 1, wherein the user designates a task item as done by clicking a "done" icon presented with the task item in the to-do list whereupon the task item will be automatically moved to the completed list and removed from the to-do list.

10. The non-transitory, computer-readable media as recited in claim 1, wherein the instructions provide for the user to share task items via a social networking web site.

11. The non-transitory, computer-readable media as recited in claim 1, wherein the instructions associate with a task item within the to-do list content that is contextually related to the task item.

12. The non-transitory, computer-readable media as recited in claim 11, wherein the tag associated with the task item is used to determine content that is contextually related to the task item.

13. The non-transitory, computer-readable media as recited in claim 11, wherein the content comprises instructions for completing a task.

14. The non-transitory, computer-readable media as recited in claim 4, wherein the instructions provide for the user to search for pre-created task items.

15. The non-transitory, computer-readable media as recited in claim 1, wherein the instructions issue a notification to a user that a task item within the to-do list has an upcoming due date.

16. The non-transitory, computer readable media as recited in claim 1, wherein the to-do list comprises a to-buy list into which is placed the purchasing task.

17. The non-transitory, computer readable media as recited in claim 1, wherein the user interaction comprises a user mousing over at least one of the task item and the purchasing task within the to-do list.

18. The non-transitory, computer readable media as recited in claim 1, wherein the product was pre-mapped to the corresponding task item for causing the purchasing task to be automatically added to the to-do list.

19. A computer-implemented method for allowing a user to manage to-do list task items, the steps comprising:

providing a user interface comprising user interface elements for allowing the user to add one or more task items to a to-do list, for allowing the user to add, to the to-do list, one or more task items from a list of task items shared by other users from an online social network, for allowing the user to edit one or more fields associated with a task item added to the to-do list, and for allowing the user to designate a task item within the to-do list as completed whereupon the designated task item is automatically placed into a completed list and removed from the to-do list, without further user intervention;

in response to a task item being added to the to-do list, causing a purchasing task indicative of a need to purchase a product for use, in connection with performance of the task item to be automatically added to the to-do list, without further user intervention;

in response to a user interaction with the purchasing task item within the to-do list, causing a pop-up window to be automatically displayed, wherein the pop-up window includes a link to an on-line vendor of product, from which a product needed to perform the purchasing task is purchasable;

in response to the product being purchased from an on-line vendor of the product, causing the purchasing task to be automatically placed into the completed list and removed from the to-do list, without further user intervention; and wherein a task item is defined by at least a title, a description, a due date, and a tag.

20. The non-transitory, computer-readable media as recited in claim 19, wherein the user interaction comprises a user mousing over the task item within the to-do list.

21. The non-transitory, computer-readable media as recited in claim 19, wherein the user interaction comprises a user activating a "get-it-done" link associated with the task item within the to-do list.

22. The non-transitory, computer-readable media as recited in claim 19, wherein the instructions examine at least one of the title, description, and tag associated with the task item within the to-do list being interacted with to determine which link to include within the pop-up window.

23. The non-transitory, computer-readable media as recited in claim 1, wherein the instructions provide for the user interface elements to allow the user to drag and drop a particular task item of the to-do list to and from a second to-do list.

\* \* \* \* \*